United States Patent
Zicker

[19]

[11] Patent Number: 5,774,805
[45] Date of Patent: Jun. 30, 1998

[54] MULTI-MODE COMMUNICATION NETWORK WITH HANDSET-SELECTED CHANNEL ASSIGNMENTS

[75] Inventor: Robert G. Zicker, Roswell, Ga.

[73] Assignee: GTE Mobile Communications Service Corporation, Atlanta, Ga.

[21] Appl. No.: 660,031

[22] Filed: Jun. 6, 1996

Related U.S. Application Data

[63] Continuation-in-part of Ser. No. 263,711, Jun. 22, 1994, which is a continuation-in-part of Ser. No. 201,455, Feb. 24, 1994, Pat. No. 5,594,782.

[51] Int. Cl.[6] ...................................................... H04Q 7/32
[52] U.S. Cl. ........................... 455/426; 455/450; 455/552
[58] Field of Search ..................................... 455/450, 451, 455/452, 454, 455, 553, 462, 463, 465, 552, 418, 410, 426

[56] References Cited

U.S. PATENT DOCUMENTS

| | | | |
|---|---|---|---|
| 4,989,230 | 1/1991 | Gillig et al. | 455/552 |
| 5,218,716 | 6/1993 | Comroe et al. | 455/552 |
| 5,230,081 | 7/1993 | Yamada et al. | 455/447 |
| 5,260,988 | 11/1993 | Schellinger et al. | 455/552 |
| 5,452,471 | 9/1995 | Leopold et al. | 455/429 |
| 5,483,666 | 1/1996 | Yamada et al. | 455/449 |
| 5,504,803 | 4/1996 | Yamada et al. | 455/552 |
| 5,625,672 | 4/1997 | Yamada et al. | 455/449 |

*Primary Examiner*—Dwayne D. Bost
*Assistant Examiner*—Myron K. Wyche
*Attorney, Agent, or Firm*—Leonard C. Suchyta

[57] ABSTRACT

A multi-mode communication network (12) accommodates piloted cellular operation and pilotless cordless operation using a multi-mode handset (18). A common pool of channels (28) serves cellular and cordless operations. At least some channels from a cordless subset (32) of the pool of channels (28) are unused in cellular operations regardless of location. The handset (18) monitors forward portions of all cordless subset channels when the handset (18) is within the coverage area (16) of its cordless base station (22). Unused channels are indicated on a dormant channel list (70), which is passed to the handset's cordless base station (22) when the handset (18) registers for cordless operation. The cordless base station (22) makes an active channel list (62) based upon the dormant channel list (70). Cordless operation messages transmitted from either a handset (18) or cordless base station (22) use a channel selected from the active channel list (62).

26 Claims, 7 Drawing Sheets

A BLOCK

| A | B | C | D | E | F | G | A | B | C | D | E | F | G |
|---|---|---|---|---|---|---|---|---|---|---|---|---|---|
| 1 | 2 | 3 | 4 | 5 | 6 | 7 | 8 | 9 | 10 | 11 | 12 | 13 | 14 |
| 22 | 23 | 24 | 25 | 26 | 27 | 28 | 29 | 30 | 31 | 32 | 33 | 34 | 35 |
| 43 | 44 | 45 | 46 | 47 | 48 | 49 | 50 | 51 | 52 | 53 | 54 | 55 | 56 |
| 64 | 65 | 66 | 67 | 68 | 69 | 70 | 71 | 72 | 73 | 74 | 75 | 76 | 77 |
| 85 | 86 | 87 | 88 | 89 | 90 | 91 | 92 | 93 | 94 | 95 | 96 | 97 | 98 |
| 106 | 107 | 108 | 109 | 110 | 111 | 112 | 113 | 114 | 115 | 116 | 117 | 118 | 119 |
| 127 | 128 | 129 | 130 | 131 | 132 | 133 | 134 | 135 | 136 | 137 | 138 | 139 | 140 |
| 148 | 149 | 150 | 151 | 152 | 153 | 154 | 155 | 156 | 157 | 158 | 159 | 160 | 161 |

| A | B | C | D | E | F | G |
|---|---|---|---|---|---|---|
| 15 | 16 | 17 | 18 | 19 | 20 | 21 |
| 36 | 37 | 38 | 39 | 40 | 41 | 42 |
| 57 | 58 | 59 | 60 | 61 | 62 | 63 |
| 78 | 79 | 80 | 81 | 82 | 83 | 84 |
| 99 | 100 | 101 | 102 | 103 | 104 | 105 |
| 120 | 121 | 122 | 123 | 124 | 125 | 126 |
| 141 | 142 | 143 | 144 | 145 | 146 | 147 |
| 162 | 163 | 164 | 165 | 166 | 167 | 168 |

| 169 | 170 | 171 | 172 | 173 | 174 | 175 | 176 | 177 | 178 | 179 | 180 | 181 | 182 | 183 | 184 | 185 | 186 | 187 | 188 | 189 |

| 190 | 191 | 192 | 193 | 194 | 195 | 196 | 197 | 198 | 199 | 200 | 201 | 202 | 203 | 204 | 205 | 206 | 207 | 208 | 209 | 210 |
| 211 | 212 | 213 | 214 | 215 | 216 | 217 | 218 | 219 | 220 | 221 | 222 | 223 | 224 | 225 | 226 | 227 | 228 | 229 | 230 | 231 |
| 232 | 233 | 234 | 235 | 236 | 237 | 238 | 239 | 240 | 241 | 242 | 243 | 244 | 245 | 246 | 247 | 248 | 249 | 250 | 251 | 252 |
| 253 | 254 | 255 | 256 | 257 | 258 | 259 | 260 | 261 | 262 | 263 | 264 | 265 | 266 | 267 | 268 | 269 | 270 | 271 | 272 | 273 |
| 274 | 275 | 276 | 277 | 278 | 279 | 280 | 281 | 182 | 283 | 284 | 285 | 286 | 287 | 288 | 289 | 290 | 291 | 292 | 293 | 294 |
| 295 | 295 | 297 | 298 | 299 | 300 | 301 | 302 | 303 | 304 | 305 | 306 | 307 | 308 | 309 | 310 | 311 | 312 | — | — | — |
| 313 | 314 | 315 | 316 | 317 | 318 | 319 | 320 | 321 | 322 | 323 | 324 | 325 | 326 | 327 | 328 | 329 | 330 | 331 | 332 | 333 |

| 334 | 335 | 336 | 337 | 338 | 339 | 340 | 341 | 342 | 343 | 344 | 345 | 346 | 347 | 348 | 349 | 350 | 351 | 352 | 353 | 354 |
| 355 | 356 | 357 | 358 | 359 | 360 | 361 | 362 | 363 | 364 | 365 | 366 | 367 | 368 | 369 | 370 | 371 | 372 | 373 | 374 | 375 |
| 376 | 377 | 378 | 379 | 380 | 381 | 382 | 383 | 384 | 385 | 386 | 387 | 388 | 389 | 390 | 391 | 392 | 393 | 394 | 395 | 396 |
| 397 | 398 | 399 | 400 | 401 | 402 | 403 | 404 | 405 | 406 | 407 | 408 | 409 | 410 | 411 | 412 | 413 | 414 | 415 | 416 | 417 |
| 418 | 419 | 420 | 421 | 422 | 423 | 424 | 425 | 426 | 427 | 428 | 429 | 430 | 431 | 432 | 433 | 434 | 435 | 436 | 437 | 438 |
| 439 | 440 | 441 | 442 | 443 | 444 | 445 | 446 | 447 | 448 | 449 | 450 | 451 | 452 | 453 | 454 | 455 | 456 | 457 | 458 | 459 |
| 460 | 461 | 462 | 463 | 464 | 465 | 466 | 467 | 468 | 469 | 470 | 471 | 472 | 473 | 474 | 475 | 476 | 477 | 478 | 479 | 480 |
| 481 | 482 | 483 | 484 | 485 | 486 | 487 | 488 | 489 | 490 | 491 | 492 | 493 | 494 | 495 | 496 | 497 | 498 | 499 | 500 | 501 |
| 502 | 503 | 504 | 505 | 506 | 507 | 508 | 509 | 510 | 511 | 512 | 513 | 514 | 515 | 516 | 517 | 518 | 519 | 520 | 521 | 522 |
| 523 | 524 | 525 | 526 | 527 | 528 | 529 | 530 | 531 | 532 | 533 | 534 | 535 | 536 | 537 | 538 | 539 | 540 | 541 | 542 | 543 |
| 544 | 545 | 546 | 547 | 548 | 549 | 550 | 551 | 552 | 553 | 554 | 555 | 556 | 557 | 558 | 559 | 560 | 561 | 562 | 563 | 564 |
| 565 | 566 | 567 | 568 | 569 | 570 | 571 | 572 | 573 | 574 | 575 | 576 | 577 | 578 | 579 | 580 | 581 | 582 | 583 | 584 | 585 |
| 586 | 587 | 588 | 589 | 590 | 591 | 592 | 593 | 594 | 595 | 596 | 597 | 598 | 599 | 600 | 601 | 602 | 603 | 604 | 605 | 606 |
| 607 | 608 | 609 | 610 | 611 | 612 | 613 | 614 | 615 | 616 | 617 | 618 | 619 | 620 | 621 | 622 | 623 | 624 | 625 | 626 | 627 |
| 628 | 629 | 630 | 631 | 632 | 633 | 634 | 635 | 636 | 637 | 638 | 639 | 640 | 641 | 642 | 643 | 644 | 645 | 646 | 647 | 648 |
| 649 | 650 | 651 | 652 | 653 | 654 | 655 | 656 | 657 | 658 | 659 | 660 | 661 | 662 | 663 | 664 | 665 | 666 | — | — | — |

B BLOCK

MULTI-MODE COMMUNICATION NETWORK WITH HANDSET-SELECTED CHANNEL ASSIGNMENTS

This application is a continuation-in-part of Ser. No. 08/263,711, filed Jun. 22, 1994, entitled "Multiple Mode Personal Wireless Communications System," by Robert G. Zicker, et al., which is a Continuation-In-Part of Ser. No. 08/201,455, filed Feb. 24, 1994, now U.S. Pat. No. 5,594,782, entitled "Multiple Mode Personal Wireless Communication System," by Robert G. Zicker, et al. both of which are incorporated herein by reference.

TECHNICAL FIELD OF THE INVENTION

The present invention relates generally to radiotelephones which operate as cordless phones using radio frequency channels also used by cellular phones.

BACKGROUND OF THE INVENTION

Multi-mode communication systems use common components for multiple functions. For example, a multi-mode communication system may use a common portable radiotelephone handset to communicate both in a cordless mode of operation and a cellular mode of operation. In the cordless mode of operation, the handset may communicate at low power with a cordless base station typically located within a few hundred feet of the handset. The cordless base station may couple to one or more local loops of a public switched telecommunication network (PSTN). Thus, the handset may communicate through the cordless base station with telephonic devices that couple to the PSTN. In the cellular mode of operation, the handset may communicate at moderate power with a cellular land station typically located within a few miles of the handset. The cellular land station typically couples to the PSTN through a mobile telephone switching office (MTSO). Thus, the handset may communicate through the cellular land station with telephonic devices that couple to the PSTN.

From a user's perspective, cordless operation is more desirable than cellular operation because cordless communication services are typically provided at lower cost than cellular communication services. From a communication service provider's perspective, the low power characteristic of cordless operation allows a given spectrum bandwidth to carry many more communications in a given area than cellular operation. However, a cordless base station's radio coverage area is much smaller than a cellular land station's coverage area.

In a typical situation, a cordless base station may be located near a user's residence or work place. Cordless mode operations are available through the handset when the user is near the user's residence or work, and cellular mode operations are available in other locations. Various handoff, automatic registration and call forwarding schemes may be employed so that the handset automatically switches between cordless and cellular modes as needed to track movement of the handset.

The earliest multi-mode radiotelephones combined separate cordless transceivers and cellular transceivers in a common handset. The cordless and cellular transceivers operated in different frequency bands using different communication protocols. Potential interference between cordless and cellular operation was not a problem. However, the increased costs, weight, and power consumption of this dual transceiver approach made the approach impractical.

Subsequent generations of multi-mode radiotelephones use a common frequency band and communication protocol for both cordless mode and cellular mode operations. Since a single transceiver may be used for both cordless and cellular mode operations, cost, weight, and power consumption improvements result. However, a potential for interference exists between the cordless mode and cellular mode operations, and channels used for cordless operations in one location should be carefully selected to prevent interference with the same channels being used for nearby cellular operations.

One prior art multi-mode communication system is configured so that a cordless base station monitors conventional reverse cellular channels to determine which cellular channels are not in use where the cordless base station is located. Once the cordless base station finds a clear channel, it entirely consumes the channel by broadcasting a pilot signal which mimics a conventional cellular pilot or control channel. Unfortunately, this approach is unreliable and inefficient. This approach does not reliably detect unused channels because the reverse cellular channels which the cordless base station monitors typically carry weak signals transmitted by portable handsets. Thus, the cordless base stations often mistakenly conclude that occupied channels are clear channels. This mistake leads to interference which prevents successful cordless and cellular communications in the surrounding area.

Moreover, the use of a continuous pilot channel prevents the pilot channel from carrying user communications. The low power characteristic of cordless mode communications causes the ratio of pilot channels to channels which carry cordless mode user communications to be very high. In particular, this ratio is much greater than occurs with conventional cellular communications. In other words, the use of a continuous pilot channel leads to an inefficient use of spectrum, and the inefficiency increases as the transmission power decreases. In addition, the constant transmission of pilot signals from various cordless base stations increases the background noise for all cordless and cellular mode communications taking place in the surrounding area and further increases interference.

The above-listed related patents propose non-piloted cordless operation in a multi-mode communication system. In order to maximize overall spectrum usage efficiency for both cordless and cellular operations, the above-listed related patents also propose dedicating a portion of the spectrum otherwise available for cellular operations to exclusive use by cordless operations. Unfortunately, the continued growth in cellular communication popularity and the desire to bring new cellular technologies on-line using existing cellular frequency channels has increased the already intensely strong demand for cellular channels, cordless mode operations notwithstanding. This tremendous demand for cellular channels makes the dedication of a portion of the cellular spectrum for exclusive cordless use difficult to achieve.

SUMMARY OF THE INVENTION

Accordingly, it is an advantage of the present invention that an improved multi-mode communication network with handset-selected channel assignments is provided.

Another advantage of the present invention is that handsets monitor forward cellular channels to form a list of channels which are potentially available for cordless use.

Another advantage of the present invention is that handsets monitor forward cellular channels in a manner which is compatible with non-piloted cordless operation.

Another advantage is that cellular channel usage changes are reliably tracked without risking impaired cordless operation or substantial interference.

Another advantage is that reliable cordless channel assignments are made while efficiently utilizing spectrum.

Another advantage is that no portion of the common spectrum shared by cordless and cellular operations is dedicated exclusively to cordless use.

The above and other advantages of the present invention are carried out in one form by a method of operating a portable radiotelephone handset. The handset is operated in cooperation with a multi-mode communication network in which a common pool of channels is used for both cellular mode communications and cordless mode communications. In this multi-mode communication network, radio coverage areas of a cellular land station and a cordless base station overlap. The method calls for identifying a plurality of radio communication channels which are unused by the cellular land station. Identities of the channels are passed to the cordless base station. The handset then engages in user communications with the cordless base station using one of the channels.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a frequency management chart which illustrates an exemplary common pool of channels used for cordless and cellular operations;

DETAILED DESCRIPTION OF THE PREFERRED EMBODIMENTS

Figure 1:
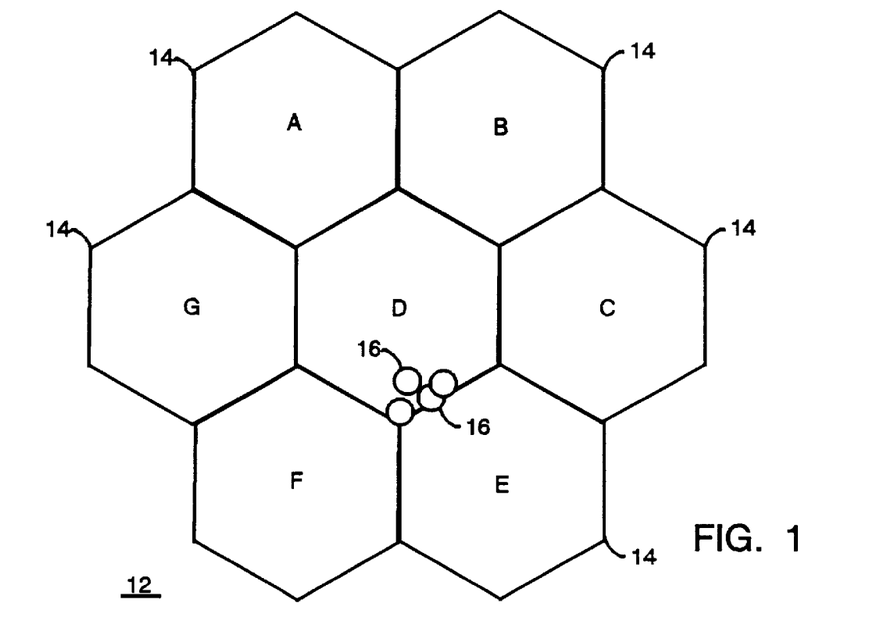
FIG. 1 shows a schematic view of an environment in which a multi-mode communication network may be implemented.
Figure 2:
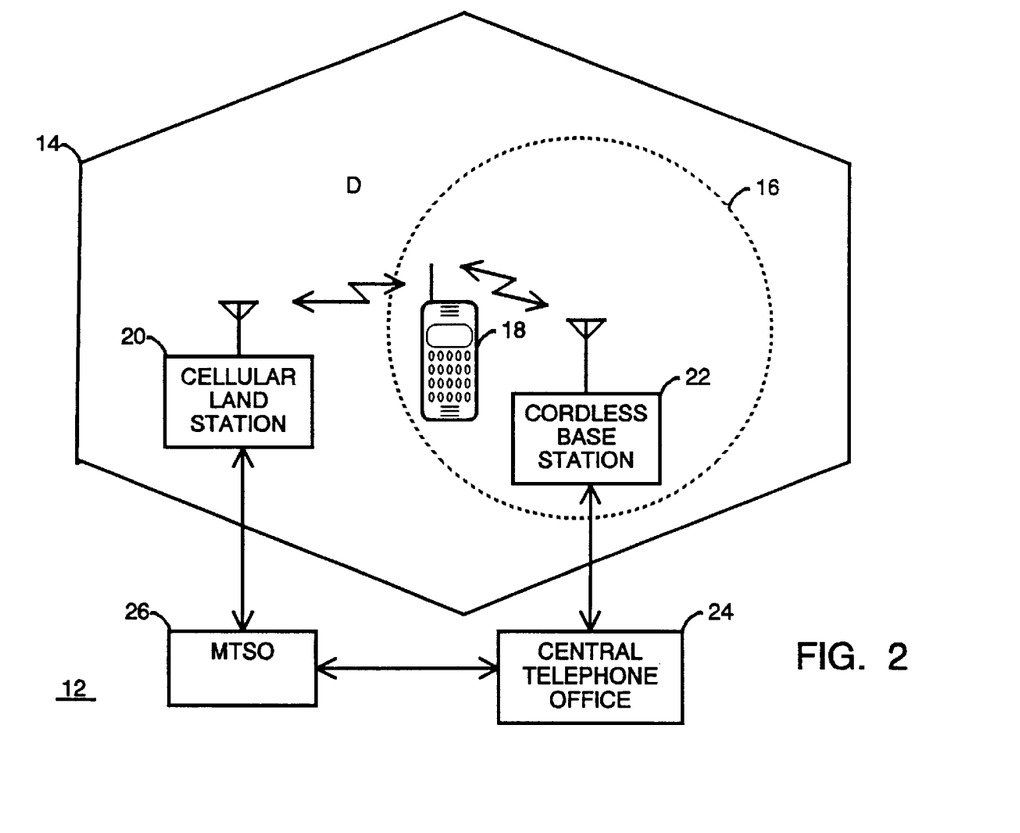
FIG. 2 shows a schematic view of components included in the multi-mode communication network.

FIG. 1 shows a schematic view of an environment in which a multi-mode communication network 12 may be implemented. FIG. 2 shows a schematic block diagram view of components included in network 12. Referring to FIGS. 1 and 2, network 12 supports a cellular communication system defined by a grid of cells 14 and any number of cordless communication systems defined by coverage areas 16. FIG. 1 shows only a seven cell cluster of cells 14 schematically shaped as hexagons and only a few of cordless coverage areas 16 schematically shaped as circles. Many more cells 14 and/or cordless coverage areas 16 may be included. Various ones of cells 14 may be located near each other as may be various ones of cordless coverage areas 16. Cells 14 and cordless coverage areas 16 overlap one another. Desirably, each cordless coverage area 16 is substantially smaller than cells 14. Although not shown, other cellular systems may be overlaid on the same area depicted in FIGS. 1 and 2. In the preferred embodiments, the cellular system is compatible with conventional AMPS standards, and the cordless systems also utilize AMPS standard frequency channels and communication protocols. However, nothing prevents the principles of the present invention from being applied to other types of cellular systems.

As illustrated in FIG. 2, network 12 includes any number of portable multi-mode radiotelephone handsets 18, of which only one is shown, a cellular land station 20 for each cell 14, and a cordless base station 22 for each cordless coverage area 16. Cellular land station 20 and cordless base station 22 each represent base stations. The terms cellular land station and cordless base station are used herein only to distinguish the two from one another and to remain consistent with historical usage. Cellular base stations are not required to be located on the land, and cordless base stations desirably refrain from operating at frequencies and using communication protocols which have historically been used for cordless telephony.

Handset 18 may, when located within both cell 14 and cordless coverage area 16, communicate with either cellular land station 20 or cordless base station 22. When outside cordless coverage area 16 but still within cell 14, handset 18 can communicate only with cellular land station 20. Cordless base station 22 couples to a central telephone office 24 through one or more wired local loops. Cellular land station 20 couples to central telephone office 24 through a mobile telephone switching office (MTSO) 26 and appropriate trunks. Through central telephone office 24, user communications may be provided between handset 18 and other telephonic devices coupled to the PSTN (not shown) via either cordless mode communications or cellular mode communications.

FIG. 3 shows a frequency management chart which illustrates an exemplary common pool of channels 28 used for both cordless and cellular mode communications. Channel numbers (listed as 1–666 in the FIG. 3 example) identify discrete channels. Each channel desirably represents a full duplex or bidirectional channel which has a forward portion and a reverse portion. The forward portion defines a link directed toward handset 18 while the reverse portion defines a link directed away from handset 18. Thus, when handset 18 tunes a receiver to a channel, it tunes the receiver to the forward portion of the channel, and when cellular land station 20 or cordless base station 22 tunes a receiver to a channel, they tune the receiver to the reverse portion of the channel. Each of handset 18, cellular land station 20, and cordless base station 22 may be set up to communicate on any channel identified in pool of channels 28.

However, as illustrated by FIGS. 1 and 3, handset 18, cellular land station 20, and cordless base station 22 need to restrict and otherwise manage their use of channels to minimize interference. FIG. 1 illustrates a seven cell reuse channel assignment plan well known in the cellular telephony arts. Pool of channels 28 is divided into diverse cellular subsets 30, indicated as vertical columns in FIG. 3. Each cellular subset 30 is configured so that its channels are non-contiguous. In other words, no two adjacent channels are included in any single cellular subset 30. Cellular subsets 30 (labeled A–G in FIGS. 1 and 3) are assigned to different cells 14, and cellular communications may use only channels included in the cellular subset 30 assigned to the cell 14 where communications are taking place. As illustrated in FIG. 1 cellular subset D is not reused in the cluster of cells 14 having cellular subset D in the center of the cluster. This reuse channel assignment plan maintains a minimum reuse distance between diverse locations where the same channels are reused. The greater this reuse distance, the less the risk of interference. Of course, those skilled in the art will appreciate that many other types of channel assignment plans may be used, including four channel reuse plans, sectoring, dynamic channel assignment (DCA), channel borrowing, and the like. Moreover, the precise frequencies and number of channels included in pool of channels 28 are not relevant parameters for the purposes of the present invention.

Referring to FIG. 3, pool of channels 28 also includes a cordless subset 32 of channels. Cordless subset 32 desirably includes approximately twenty contiguous channels, represented as a single horizontal row in FIG. 3. The number of channels included in cordless subset 32 is somewhat arbitrary. However, if the number is increased substantially above twenty, then the time required to sequentially scan all channels in cordless subset 32 will increase and possibly make response delay noticeable to a user. On the other hand, if the number is decreased substantially below twenty, then opportunities to find channels unused by the overlaying cellular system are diminished, and fewer channels will be available for carrying cordless communications in situations with heavy cellular communication traffic.

In accordance with the preferred embodiments, all cordless systems select the channels upon which they will operate from cordless subset 32, regardless of where the cordless systems are geographically located and regardless of which cellular subsets 30 may be assigned for use in the same location. The use of a common cordless subset 32 for all cordless systems is desirable because only cordless subset 32 may then be excluded from DCA and channel borrowing schemes occasionally used by overlaying cellular systems to maintain compatibility with cordless operation. Likewise the use of contiguous channels in cordless subset 32 is desirable because it facilitates quick scanning of the channels. In addition, the use of contiguous channels insures that wherever a cordless system is located, cordless subset 32 will include channels which are not being used by the overlaid cellular system because cellular subsets 30 use noncontiguous channels.

While FIG. 3 illustrates an exemplary selection of channels 169–189 in the A block of pool of channels 28 as cordless subset 32, this is largely an arbitrary selection. Desirably, cordless subset 32 avoids cellular control channels 34 (channels 313–354). Otherwise, any A or B block grouping of channels consistent with the system assignment (A or B) is acceptable for purposes of the present invention, and cordless subset 32 may vary from cellular system to cellular system.

Figure 4:
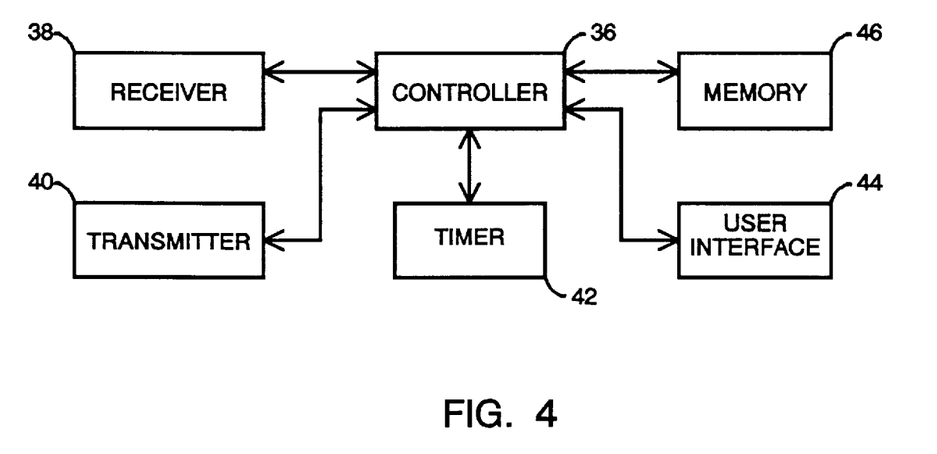
FIG. 4 shows a block diagram of hardware included in a preferred multi-mode handset.

FIG. 4 shows a block diagram of hardware included in a preferred multi-mode handset 18. For clarity, standard operating elements well known to those skilled in the art and unimportant to the present invention are not shown in FIG. 4 or described in detail herein. In general, handset 18 is configured around a controller 36, which controls the operation of handset 18. Various components are connected to or are in data communication with controller 36, including a receiver 38, a transmitter 40, a timer 42, a user interface 44, and a memory 46. Controller 36 may, for example, be a conventional microprocessor circuit well known in the cellular telephony art.

Receiver 38, which is connected to controller 36, is configured to receive signaling data and user communications over a channel selected from pool of channels 28 (see FIG. 3). For cellular mode operation, the channel will be selected from a cellular subset 30 assigned to the cell 14 where handset 18 currently resides. For cordless mode operation, the channel will be selected from cordless subset 32.

Handset 18 also includes transmitter 40, which is connected to controller 36. Transmitter 40 is configured to transmit signaling data associated with conventional cellular telephone operations and processes and user communications. If desired, transmitter 40 and receiver 38 may be integrated into one transceiver assembly. Desirably, only a single transmitter and receiver are included for supporting both cellular and cordless mode operations in order to reduce costs, power consumption, and weight.

Timer 42 couples to controller 36 and helps handset 18 track the passage of time. User interface 44 couples to controller 36 and desirably includes keypad push buttons that are utilized to control standard cellular telephone functions, a speaker, a microphone, a display, and other user interface devices well known in the art. Memory 46 couples to controller 36 and stores programming instructions that define the various processes described below. In addition, memory 46 may store various cellular operating parameters and various tables and lists of data used in the operation of handset 18.

For the purposes of the present invention, cordless base station 22 has a block diagram (not shown) similar to that shown in FIG. 4. However, receiver 38 and transmitter 40 of handset 18 operate on forward and reverse portions, respectively, of selected channels, while a corresponding receiver and transmitter of cordless base station 22 operate on reverse and forward portions, respectively, of selected channels. Likewise, cordless base station 22 may, but need not, have a simplified user interface compared to user interface 44 of handset 18. Moreover, handset 18 is desirably battery configured for portable operation while cordless base station 22 is desirably energized by a public power distribution network and is otherwise configured for stationary operation.

Figure 5:
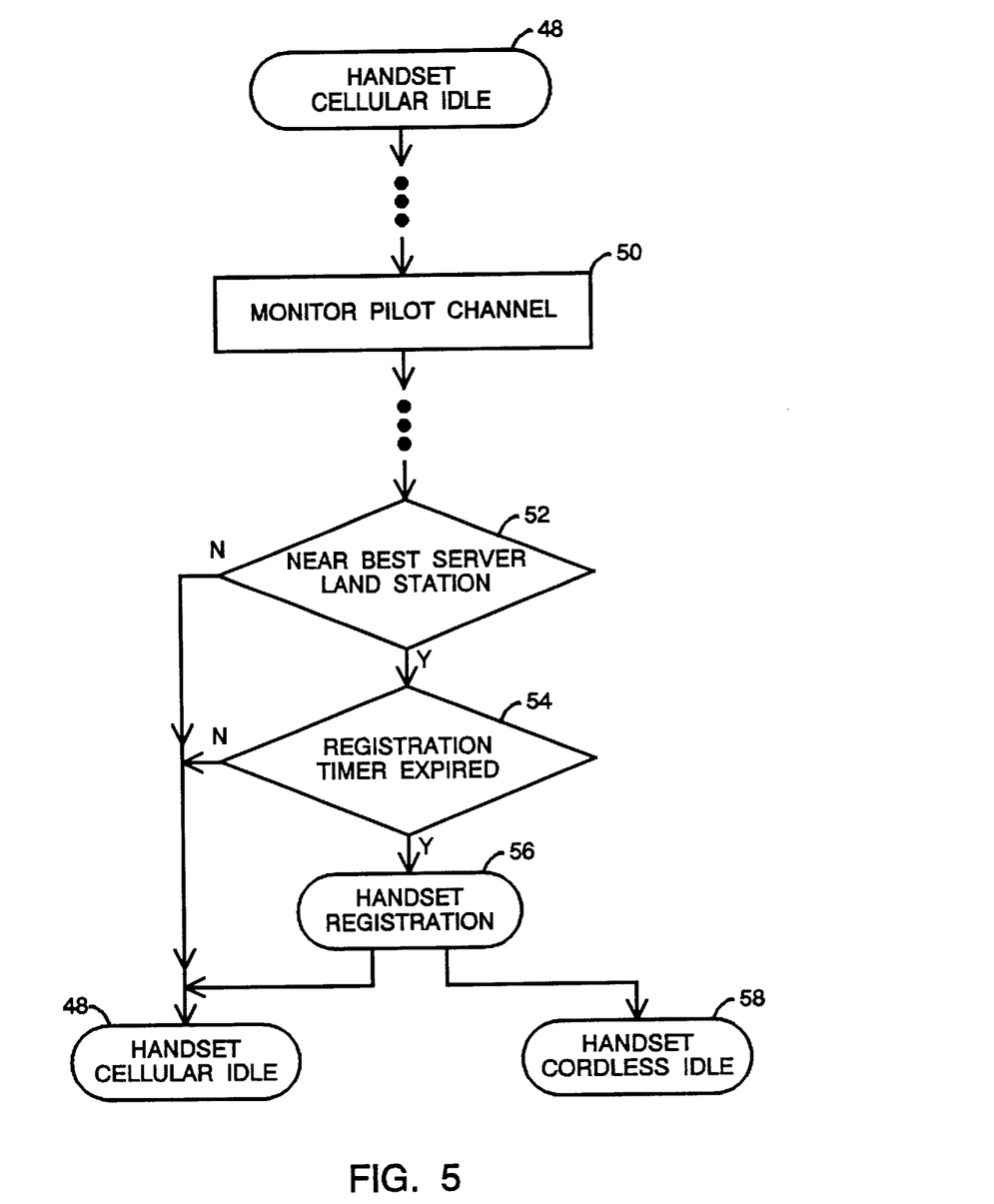
FIG. 5 shows a flow chart of a handset cellular idle process performed by the handset.

FIG. 5 shows a flow chart of a handset cellular idle process 48 performed by handset 18. Generally, process 48 is performed by handset 18 when handset 18 is in its cellular mode of operation. Handset 18 is in its cellular mode when handset 18 is away from its home cordless coverage area 16 (see FIGS. 1–2). As indicated by ellipses in FIG. 5, process 48 includes many tasks which are conventionally performed by cellular telephones but not specifically detailed herein to prevent such tasks from obfuscating the present invention. Such tasks include monitoring user interface 44 (see FIG. 4) to determine if a user wishes to place a call, selecting which pilot or control channels continuously transmitted by cellular land stations 20 to monitor, maintaining timers, and the like. Included in such conventional tasks is a task 50 which monitors the selected pilot channel. By monitoring the selected pilot channel, handset 18 may determine when incoming calls are being directed to it, when it is roaming or homing, and the like. When incoming or outgoing calls are detected, program flow may switch to other processes, not shown, to track call progress, switch to voice channels, engage in handoffs, and perform other cellular telephony activities. When calls are torn down, program control may desirably return to handset cellular idle process 48.

Eventually, program flow within process 48 performs a query task 52. Task 52 determines whether handset 18 is currently located near a best server land station 20. The best server is defined as the land station 20 whose cell 14 overlies the handset's home cordless coverage area 16. In practice, a few best servers which are located near the handset's home cordless coverage area 16 may be defined for each handset 18. The best servers may be identified by detecting digital color code and/or other land station profile data, such as an ID, control channel identity, or the like, conveyed by the overhead message stream continuously broadcast over the pilot channel selected for monitoring by handset 18.

Task 52 performs a location analysis process within handset 18 and aids the establishment of pilotless cordless operation. In pilotless operation, cordless base stations 22 refrain from continuously broadcasting a pilot signal. As discussed in more detail below, handset 18 decides to enter its cordless mode of operation only after it confirms it is within the cordless coverage area 16 of its home cordless base station 22. This confirmation occurs through a brief registration process in which handset 18 originates a low power transmission which is received and acknowledged by the home cordless base station 22. Task 52 prevents handset 18 from originating such transmissions when handset 18 cannot be located near its home cordless coverage area 16, which occurs when handset 18 is outside the cells 14 that overlie or are otherwise near the home cordless coverage area 16. This saves power by reducing the number of such handset transmissions and reduces general interference caused by transmitting messages on channels which may not be appropriate for locations from which the transmissions emanate.

When task 52 fails to detect a best server land station, program flow loops back to an entry point into handset cellular idle process 48. However, when task 52 detects a best server land station, a query task 54 determines whether a registration timer has expired. The registration timer is reset each time handset 18 makes an unsuccessful cordless registration attempt. When task 54 determines that the registration timer has not yet expired, a subsequent registration attempt is prevented. This causes handset 18 to wait after each unsuccessful registration attempt to allow time for handset 18 to move closer to the home cordless coverage area 16 before making the next attempt. Power consumption is reduced and general interference is reduced by preventing transmissions which have little likelihood of being received by their intended recipient cordless base station 22. Accordingly, when task 54 determines that the registration timer has not yet expired, program flow loops back to an entry point into handset cellular idle process 48.

When task 54 determines that the registration timer has expired, a handset registration process 56 is performed. Handset registration process 56 is discussed in detail below in connection with FIG. 6. As a result of handset registration process 56, if cordless registration is unsuccessful, program flow loops back to an entry point into handset cellular idle process 48. On the other hand, if cordless registration is successful, program flow passes to an entry point into a handset cordless idle process 58. Handset cordless idle process 58 is discussed in more detail below in connection with FIG. 7.

In summary, handset cellular idle process 48 causes handset 18 to operate in its cellular mode of operation. However, from time to time and only when handset 18 is located near its home cordless coverage area 16, handset 18 attempts a cordless registration process. Handset 18 remains in its cellular mode of operation until a cordless registration attempt is successful.

Figure 6:
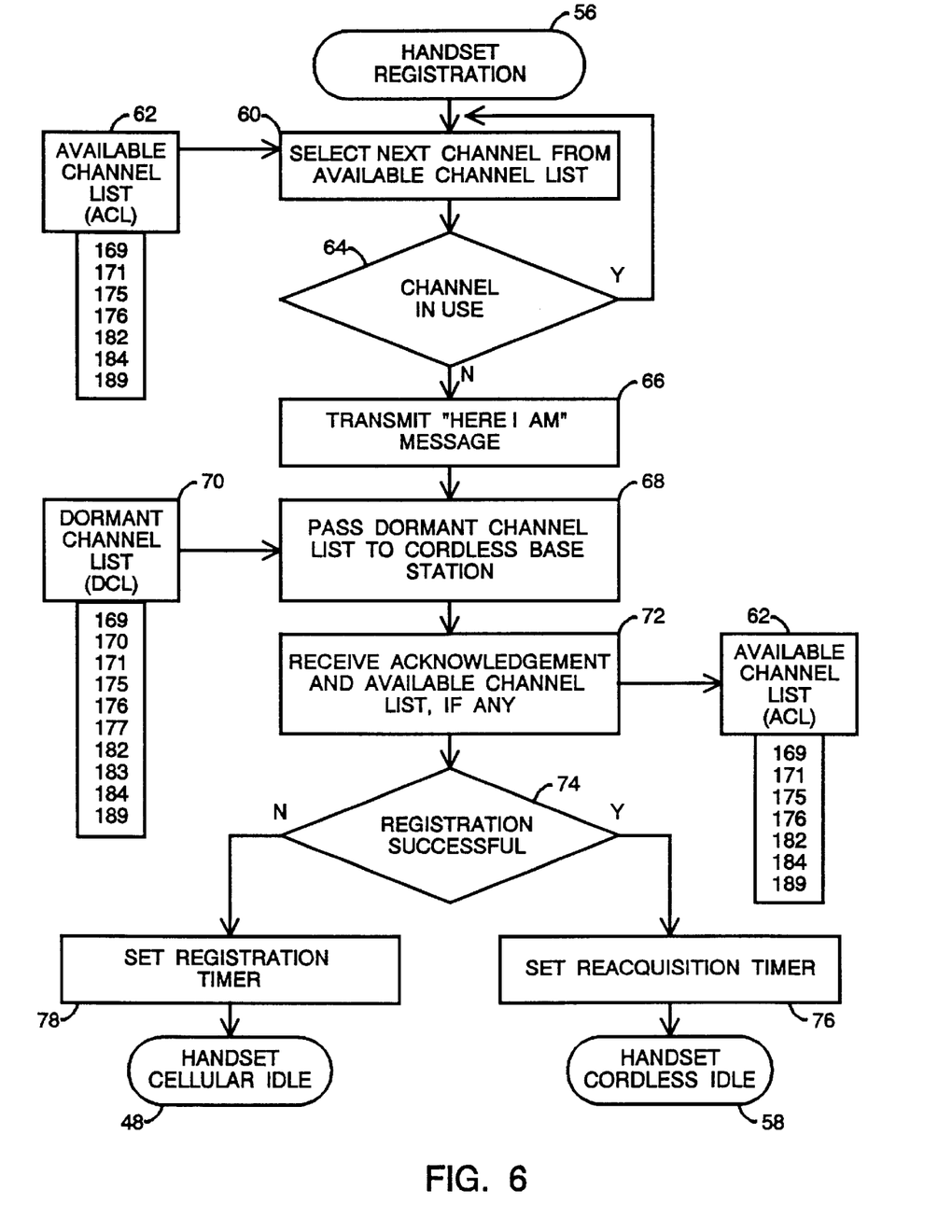
FIG. 6 shows a flow chart of a handset registration process performed by the handset.

FIG. 6 shows a flow chart of handset registration process 56 performed by handset 18. Generally, process 56 operates as a switch between the cellular and cordless modes of handset 18. Process 56 includes a task 60 which selects the next channel indicated in an available channel list 62. Task 60 operates in conjunction with a query task 64. Task 64 determines whether the selected channel is currently in use. If the selected channel is currently in use, then program flow loops back to task 60 to again select the next channel in available channel list 62. Program flow remains at tasks 60 and 64 until an unused channel is found. However, those skilled in the art may devise tests (not shown) to break this loop if an unused channel does not become available within a predetermined period of time and include additional tasks to implement an appropriate responsive action.

Available channel list 62 is a data list stored in memory 46 (see FIG. 4) and updated from time to time. List 62 identifies the channels which handset 18 may use in originating a message to be transmitted to its cordless base station 22. List 62 is a subset of cordless subset 32 (see FIG. 3). Through the operation of tasks discussed below, list 62 is formed from cordless subset 32 by handset 18, and possibly influenced by cordless base station 22, to identify channels that are unused by cellular land station 20. In particular, below-described tasks cause handset 18 to monitor each channel in cordless subset 32 to determine which of the cordless subset 32 channels also belong to the particular cellular subset 30 (see FIG. 3) currently in effect at the location where the home cordless coverage area 16 resides.

Task 64 may monitor a received signal strength indicator (RSSI) to determine whether a selected channel is currently in use. If the signal strength is above a predetermined threshold, then the channel is currently being used. A channel indicated on available channel list 62 may legitimately be in use for several reasons. For example, nearby cordless systems, whether or not the handset's home system, may be using the channel. Alternately, the channel may be receiving some interference from an adjacent channel being used in a nearby cordless system. Furthermore, the channel might be a channel in use by a local or nearby cellular system and have been mistakenly included on the available channel list or simply not an available channel at the precise location within a cell 14 where the handset 18 may be currently positioned. By checking for prior channel use from a list of potentially available channels, handset 18 improves channel assignment reliability and reduces the risks of interference. If a single channel which is not appropriate for a particular location is nevertheless included on available channel list 62, tasks 60 and 64 prevent that inclusion from causing interference. Since a plurality of channels are included on available channel list 62, a good likelihood exists that an acceptable unused channel can be found.

When task 64 finds a channel from available channel list 62 that is not currently in use, a task 66 transmits a "Here I Am" message over the channel. This message is transmitted at sufficiently low power so that the message is unlikely to be received by cordless base station 22 unless handset 18 is located within cordless coverage area 16. Desirably, the message is transmitted as a burst communication using a reverse control channel protocol compatible with AMPS cellular telephony. The burst continues until answered by cordless base station 22 or until a predetermined duration transpires. This predetermined duration may be around 1.5 to 2.0 seconds. It is desirably sufficiently long so that cordless base station 22 may scan an entire, maximum size, available channel list 62 and decode communications found on all channels thereon.

After or in conjunction with task 66, a task 68 passes a dormant channel list 70 to cordless base station 22. Task 68 assumes that dormant channel list 70 may be included with the "Here I Am" message discussed above in connection with task 66. However, this is not a requirement. Dormant channel list 70 is a data list stored in memory 46 (see FIG. 4) and updated from time to time. List 70 identifies the channels from cordless subset 32 which handset 18 has found to be dormant or otherwise currently unused when handset 18 resides in its home cordless coverage area 16. Dormant channel list 70 may, but need not, be equivalent to available channel list 62. During task 68, handset 18 passes dormant channel list 70 to cordless base station 22. As discussed below in connection with FIG. 8, cordless base station 22 may filter or otherwise alter dormant channel list 70 in composing available channel list 62. After task 68, a task 72 is performed to receive an acknowledgment message which includes available channel list 62 from cordless base station 22, assuming cordless base station 22 has received the "Here I Am" message. While task 72 assumes that the acknowledgment message also conveys available channel list 62, this is not a requirement.

Figure 7:
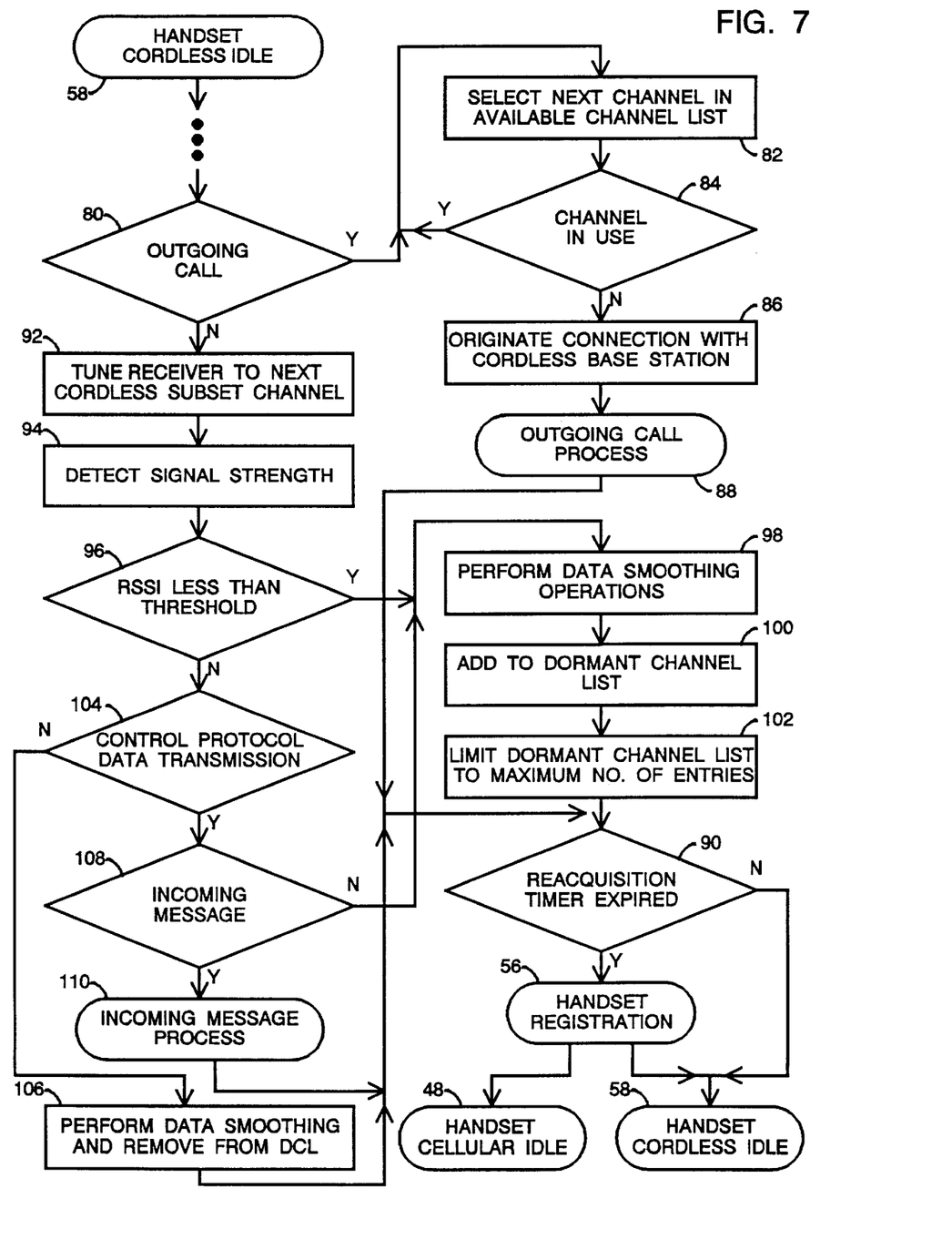
FIG. 7 shows a flow chart of a handset cordless idle process performed by the handset.

As soon as a message is received or after expending a predetermined period of time with tasks 66, 68, and 72, process 56 performs a query task 74 to determine whether the registration was successful. If an acknowledgment message is received, then the registration is deemed successful. In an alternate embodiment (not shown), the exchange of dormant channel list 70 and available channel list 62 may be delayed until after registration has been deemed successful and may occur through the exchange of other messages. When registration is successful, a task 76 sets a reacquisition timer to expire a few minutes in the future, and program flow proceeds to handset cordless idle process 58. Thereafter, handset 18 operates in its cordless mode.

When task 72 fails to detect an acknowledgement message, task 74 declares the registration attempt to be unsuccessful. A task 78 sets the registration timer to expire a few minutes in the future, and program flow proceeds to handset cellular idle process 48. Thereafter, handset 18 operates in its cellular mode.

FIG. 7 shows a flow chart of handset cordless idle process 58 performed by handset 18. Process 58 is performed by handset 18 when it is in its cordless mode of operation. Handset 18 is in its cordless mode when handset 18 is within its home cordless coverage area 16 (see FIGS. 1–2) and has successfully registered with its home cordless base station 22. Accordingly, process 58 is performed when handset 18 is located near its cordless base station 22. As indicated by ellipsis in FIG. 7, process 58 includes many tasks which are conventionally performed by cellular and multi-mode telephones but are not specifically detailed herein to prevent such tasks from obfuscating the present invention. Such tasks include monitoring user interface 44 (see FIG. 4) to determine if a user wishes to place a call or make other programming changes to handset 18, maintaining timers, and the like.

Eventually, handset cordless idle process 58 performs a query task 80. Task 80 determines whether user keypad manipulations signify that the user wishes to originate an outgoing call from handset 18. When an outgoing call event is detected, a task 82 selects the next channel indicated in available channel list 62 (see FIG. 6). Task 82 operates in conjunction with a query task 84. Task 84 determines whether the selected channel is currently in use. If the selected channel is currently in use, then program flow loops back to task 82 to again select the next channel in available channel list 62. Program flow remains at tasks 82 and 84 until an unused channel is found. When task 84 determines that a clear channel from available channel list 62 has been found, a task 86 originates a connection with cordless base station 22. Task 86 originates its connection by transmitting a message which indicates to cordless base station 22 that handset 18 wishes to originate an outgoing call. In a manner similar to that discussed above in connection with task 66 (see FIG. 6), task 86 transmits a burst transmission which continues until cordless base station 22 responds. Since cordless base station 22 may need to scan several channels included on active channel list 62 before encountering the channel selected above in tasks 82 and 84, this transmission may continue for a maximum duration of around 1.5 to 2.0 seconds. After task 86, program flow passes to an outgoing call process 88.

Outgoing call process 88 monitors call progress through to call tear down. If the call is set-up successfully, then user communications are conveyed through the connections established for the call. Such user communications are conveyed between handset 18 and cordless base station 22 over the channel selected above in tasks 82 and 84.

Upon completion of outgoing call process 88, program flow returns to handset cordless idle process 58 at a query task 90. Task 90 determines whether the reacquisition timer has expired yet. As discussed above in connection with FIG. 6, the reacquisition timer is set during handset registration process 56 to indicate when handset 18 should attempt to re-register with cordless base station 22. The reacquisition timer may be adjusted in other processes as well. When the reacquisition timer has not yet expired, program flow loops back to an entry point in handset cordless idle process 58. However, when the reacquisition timer has expired, program flow proceeds to handset registration process 56 (see FIG. 6). Handset registration process 56 will switch handset operation to its cellular mode of operation (handset cellular idle process 48) unless a successful registration attempt occurs with cordless base station 22. When handset 18 successfully re-registers with its cordless base station 22, handset 18 remains in its cordless mode of operation, and program flow loops back to an entry point in handset cordless idle process 58.

Referring back to task 80, when no outgoing call event is detected, program flow proceeds from task 80 to a task 92. Task 92 tunes receiver 38 (see FIG. 4) to the next channel in cordless subset 32 (see FIG. 3). The channel to which receiver is tuned in task 92 may or may not be included on dormant channel list 70 or available channel list 62 (see FIG. 6). As discussed above, receiver 38 in handset 18 is actually tuned to the forward portion of the selected channel. Those skilled in the art will appreciate that the various tasks included in handset cordless idle process 58 are continuously repeated so long as handset 18 remains in its cordless idle mode of operation. Through repeated iterations of task 92, receiver 38 is eventually sequentially tuned to all channels included in cordless subset 32.

After task 92, a task 94 detects the signal strength of the radio frequency (RF) energy received over the channel to which receiver 38 was tuned in task 92. Since handset 18 monitors the forward portion of the channel, it receives signals which are transmitted by cellular land stations 20 (see FIG. 2) and cordless base stations 22 (see FIG. 2) rather than signals transmitted by cellular mobile and portable telephones. Signals transmitted by cellular land stations 20 indicate used channels which are not available for cordless operations. Such signals are typically stronger than the complementary reverse channel signals transmitted by cellular mobile and particularly cellular portable telephones. Accordingly, handset 18 is more likely to detect when cellular operations are using a channel than a device which monitors signals transmitted over reverse portions of channels.

Next, a query task 96 determines whether the signal strength detected in task 94 is less than a predetermined threshold value. Desirably, this threshold value is set at a very low level which is at or below the minimum signal level required for cordless operations. Task 96 may evaluate a received signal strength indicator (RSSI) in making its determination. When signal strength below the threshold is detected, an unused channel has been identified. When an unused channel is identified, a task 98 performs data smoothing operations to determine whether the unused channel indication is a real and reliable reading or an anomaly. Task 98 may employ various averaging, filtering, hysteresis, and other data smoothing techniques known to those skilled in the art. Moreover, those skilled in the art will appreciate that the data smoothing operations of task 98 for any single channel may actually take place over several iterations of task 98. Accordingly, task 98 may desirably track signal strength readings for each channel included on cordless subset 32 over a period of time.

After task 98, a task 100 adds the channel identity to dormant channel list 70 (see FIG. 6), assuming the data smoothing operations of task 98 indicate that the unused characteristic of the channel appears to be a real phenomenon and not an anomaly.

After task 100, a task 102 manages dormant channel list 70 so that its size is limited to a maximum number of channels. That maximum number is desirably less than about 75% of the total number of channels included in cordless subset 32, and a maximum number of around ten channels appears to be preferred. Limiting the maximum number of channels on dormant channel list 70 accomplishes two purposes. First, the fewer channels eventually transferred from dormant channel list 70 to active channel list 62 (see FIG. 6), the shorter the period of time needed by handset 18 to transmit its burst transmissions in tasks 66 (see FIG. 6) and 86 to be insured that cordless base station 22 has sufficient opportunity to receive the relevant messages. Shorter transmission times reduce power consumption, reduce interference risks, and improve the responsiveness of handset 18 to user commands.

As a second purpose, limiting the maximum number of channels to be included on dormant channel list 70 gives the cellular system the opportunity to optimize the selected channels. Accordingly, task 102 desirably incorporates a suitable prioritization scheme which identifies the better channels and includes only the better channels on dormant channel list 70 when more than the maximum number of permitted channels has been deemed acceptable for use in cordless operations. The prioritization scheme may, for example, recognize channels having less background noise as being better than other channels.

After task 102, program flow proceeds to task 90, discussed above, to handle reacquisition if necessary before looping back to an entry point in handset cordless idle process 58.

Referring back to task 96, when a channel from cordless subset 32 is discovered to exhibit a signal strength above the threshold, a query task 104 attempts to detect the signal. Task 104 then determines whether the channel's signal is a control protocol data transmission. As discussed above, cordless subset 32 is desirably confined to the portion of pool of channels 28 (see FIG. 3) where no cellular control channels 34 (see FIG. 3) reside. Cellular operations utilize control protocol data transmissions over control channels 34 but not over voice channels where cordless subset 32 is likely to reside.

If task 104 does not recognize the signal found at a cordless subset 32 channel as a control protocol data transmission, a task 106 is performed. Task 106 performs data smoothing to insure that the detected signal is a real event rather than an anomaly, and if it is deemed to be a real event removes the channel from dormant channel list (DCL) 70 (see FIG. 6). Of course, if the channel was not originally included on dormant channel list 70, then task 106 may be omitted. After task 106, program flow proceeds to task 90, discussed above, to handle reacquisition if necessary before looping back to an entry point in handset cordless idle process 58.

Referring back to task 104, when a cordless subset 32 channel is discovered to be conveying a control protocol data transmission, a query task 108 is performed. Task 108 is performed to determine whether the signal is conveying a message addressed to handset 18. Such a message may be received at handset 18 when, for example, a call is being set up to handset 18. If an incoming message is detected, program flow passes to an incoming message process 110.

Incoming message process 110 responds to the incoming message. If the incoming message is alerting handset 18 to an incoming call, then process 110 monitors call progress until call tear down. If the call is set-up successfully, then user communications are conveyed using the channel to which receiver 38 (see FIG. 4) was tuned in the prior iteration of task 92. Accordingly, while handset 18 limits its channel selection to available channel list 62 for originating messages to cordless base station 22, it monitors all channels in cordless subset 32 to evaluate the various signals which may be transmitted over these channels.

Upon completion of incoming message process 110, program flow returns to handset cordless idle process 58 at task 90, discussed above. Upon returning from incoming message process 110, task 90 and subsequent processes handle reacquisition if necessary before looping back to an entry point in handset cordless idle process 58.

Referring back to task 108, when handset 18 discovers a cordless subset 32 channel which is conveying a control protocol data transmission not addressed to handset 18, then handset 18 interprets this discovery as an unused channel. This situation occurs, for example, when a nearby cordless base station 22 which is not the home cordless base station 22 for handset 18 is using the channel. Due to the low power characteristic of cordless operation, handset 18 must be very close to "interfering" cordless base station 22 to hear such a signal. If another nearby cordless system has concluded that the channel is unused, then handset 18 may reliably draw the same conclusion. Accordingly, when task 108 determines that the control protocol data transmission message is not addressed to handset 18, program flow proceeds to task 98, discussed above. The channel will be added to dormant channel list 70 if it is deemed a real event and not simply an anomaly. In addition, such channels used by nearby cordless systems may be given a high priority in any prioritization scheme implemented in task 102. Eventually, program flow loops back to an entry point in handset cordless idle process 58.

In summary, handset cordless idle process 58 causes handset 18 to operate in its cordless mode of operation when handset 18 is located within the radio coverage area 16 of its cordless base station 22. In the cordless mode of operation, handset 18 monitors forward portions of all channels included in cordless subset 32 of pool of channels 28 (see FIG. 3) to detect channels which are unused by cellular land station 20 (see FIG. 2). The unused channels are included on dormant channel list 70. Reliable results are achieved because signals transmitted over forward portions of channels are typically stronger and therefore more easily detected than signals transmitted over reverse portions of channels.

Figure 8:
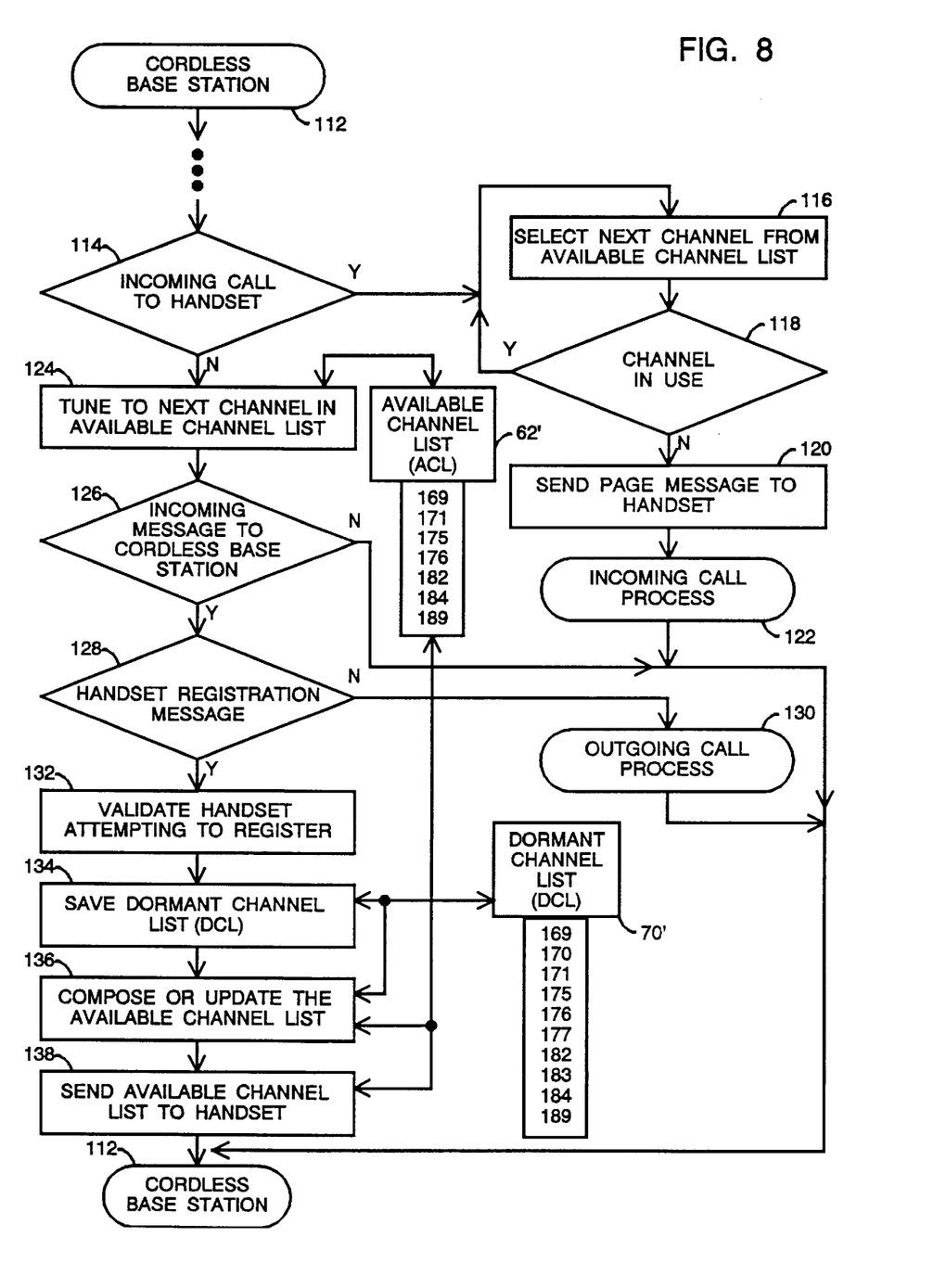
FIG. 8 shows a flow chart of a cordless base station process performed by the cordless base station.

FIG. 8 shows a flow chart of a cordless base station process 112 performed by cordless base station 22 in support of the processes discussed above in FIGS. 5–7. As indicated by ellipsis in FIG. 8, process 112 includes many tasks which are conventionally performed by cellular and cordless base stations but not specifically detailed herein to prevent such tasks from obfuscating the present invention. Eventually, cordless base station 22 performs a query task 114. Task 114 determines whether an incoming call is being setup which might involve a handset 18. An incoming call may be indicated by the receipt of a ring signal over a wired local loop between cordless base station 22 and central telephone office 24 (see FIG. 2). When an incoming call is detected, a task 116 selects the next channel indicated in an available channel list 62'. Task 116 operates in conjunction with a query task 118. Task 118 determines whether the selected channel is currently in use. If the selected channel is currently in use, then program flow loops back to task 116 to again select the next channel in available channel list 62'. Program flow remains at tasks 116 and 118 until an unused channel is found.

Available channel list 62' represents the cordless base station 22 counterpart for available channel list 62 maintained in memory 46 of handset 18 (see FIG. 4). Available channel list 62' includes the same channel identities as available channel list 62. Generally, available channel list 62' includes no channels which are not also included on available channel list 62. However, certain situations may temporarily cause available channel list 62' to include additional channel identities when available channel list 62 is being changed for multiple handsets 18 which have cordless base station 22 as a home.

When task 118 determines that a clear channel from available channel list 62' has been found, a task 120 sends a page message to handset 18. The page message informs handset 18 about the incoming call. The page message may be formatted as or prefaced by a burst signal which is held for approximately 800–900 msec using a forward channel control protocol data transmission known in AMPS cellular telephony.

This burst signal continues for this duration to provide times for all handsets 18 to sequence through all cordless subset 32 channels and decode signals received on all channels.

After task 120, program flow proceeds to an incoming call process 122 which monitors call progress until call tear down occurs. User communications may occur during the call.

Such user communications will use the channel over which the page message was sent in task 120. After process 122, program flow loops back to an entry point into cordless base station process 112.

Referring back to task 114, when no incoming call event is detected, a task 124 is performed. Task 124 causes cordless base station 22 to tune its receiver to the next channel in available channel list 62'. Following task 124, a query task 126 determines whether an incoming message addressed to cordless base station 22 is detected over this channel selected from available channel list 62'. If no incoming message is detected, then program flow loops back to an entry point into cordless base station process 112.

When task 126 detects an incoming message addressed to cordless base station 22, a query task 128 is performed. Such a message may indicate that a handset 18 is attempting to place an outgoing call, register, or send another message to cordless base station 22. Unless the message is a handset registration message of the type sent from handset 18 during task 66 (see FIG. 6), program flow proceeds to an outgoing call process 130. If the message describes a call being placed from handset 18, process 130 will monitor call progress until call tear down. User communications conveyed during the call will be conveyed using the channel to which cordless base station 22 was tuned in the last iteration of task 124.

When task 128 detects an incoming registration message, process 112 performs a task 132. Task 132 validates the handset 18 attempting to register. For example, task 132 may verify that a handset ID communicated in the registration message matches handset IDs permitted for the cordless base station 22. Although not shown, if the handset is not validated, program flow may loop back to an entry point to cordless base station process 112 without taking further action.

After validating the handset, a task 134 compliments task 68 (see FIG. 6) and saves a dormant channel list 70' received from handset 18 during registration. Dormant channel list 70' represents the cordless base station 22 counterpart to dormant channel list 70 maintained in handset 18. Cordless base station 22 may save several different dormant channel lists 70' corresponding to different handsets 18 which may be home on cordless base station 22.

After task 134, a task 136 composes or otherwise updates available channel list 62' in response to the just-received dormant channel list 70'. Next, a task 138 sends available channel list 62' to handset 18. When cordless base station 22 serves only a single handset 18, task 136 may simply equate active channel list 62' to the just received dormant channel list 70'. Then, handset 18 may compare its dormant channel list 70 to its received active channel list 62 to verify that it and cordless base station 22 agree upon the available channel list.

When cordless base station 22 serves multiple handsets 18, task 136 may, in one embodiment, merge multiple dormant channel lists 70' obtained from multiple handsets 18 in generating a single active channel list 62' which will suffice for the cordless system. In an alternate embodiment, a single one of the handsets 18 may be designated the master handset, and active channel list 62' may be composed using only the master handset's dormant channel list 70'. Likewise, task 138 may send an active channel list 62 which is a subset of the active channel list 62' maintained in cordless base station 22 to reliably incorporate changes in the active channel lists 62 maintained in diverse handsets 18. For example, until active channel list changes have been installed in all handsets 18, cordless base station 22 may maintain an active channel list 62' which is the union of all active channel lists maintained in all its handsets 18. However, desirably all handsets 18 served by a cordless base station 22 operate using substantially the same active channel list 62.

After task 138, program flow loops back to an entry point in cordless base station process 112.

In summary, the present invention provides an improved multi-mode communication network with handset-selected channel assignments. Handsets monitor the forward portions of cellular channels to form a list of channels which are potentially available for cordless use. Cellular channel usage changes which occur from time to time are reliably tracked without risking impaired cordless operation or substantial interference. The spectrum is utilized efficiently because a pilot channel need not be consumed by each cordless base station. Moreover, no portion of the common pool of channels shared by cordless and cellular operations is dedicated exclusively to cordless use.

The present invention has been described above with reference to preferred embodiments. However, those skilled in the art will recognize that changes and modifications may be made in these preferred embodiments without departing from the scope of the present invention. For example, alternate schemes to those described herein may be devised for representing and communicating dormant and active channel lists. Alternate embodiments may, for example, require handsets only to report their findings for all cordless subset channels, and may, as a further example, allow the cordless base station to take a more active role in forming the active channel list. In addition, those skilled in the art will appreciate that the precise task and process organization discussed herein may be substantially altered while achieving equivalent results. These and other changes and modifications which are obvious to those skilled in the art are intended to be included within the scope of the present invention.

What is claimed is:

1. In a multi-mode communication network in which a common pool of channels is used for both cellular mode communications and cordless mode communications and in which radio coverage areas of a cellular land station and a cordless base station overlap, a method of operating a portable radiotelephone handset comprising the steps of:

determining a location for said handset;

identifying, after said determining step, a plurality of radio communication channels which are unused by said cellular land station, said identifying step being performed when said location determining step indicates that said handset is located proximate said cellular base station;

passing identities of said channels to said cordless base station; and engaging in user communications with said cordless base station using one of said channels.

2. A method as claimed in claim 1 wherein:

said method additionally comprises the step of receiving, after said passing step, a list of available channels from said cordless base station; and said engaging step is configured to utilize a channel identified by said available channel list while engaging in said user communications.

3. In a multi-mode communication network in which a common pool of channels is used for both cellular mode communications and cordless mode communications and in which radio coverage areas of a cellular land station and a cordless base station overlap, wherein said cellular land station communicates using a first subset of said pool of channels and said cordless base station communicates using channels selected from a second subset of said pool of channels, a method of operating a portable radiotelephone handset configured to communicate with said land station and said cordless base station over any channel included in said common pool of channels, said method comprising the steps of:

identifying a plurality of radio communication channels which are unused by said cellular land station, by monitoring each channel included in said second subset to determine which of said second subset of channels also belongs to said first subset;

passing identities of said channels to said cordless base station; and engaging in user communications with said cordless base station using one of said channels.

4. A method as claimed in claim 3 wherein said second subset of channels is configured as a contiguous block of channels.

5. A method as claimed in claim 3 additionally comprising the steps of:

monitoring a forward portion of a pilot channel continuously transmitted by said land station when operating in said cellular mode; and monitoring forward portions of all channels included in said second subset of channels when operating in said cordless mode.

6. A method as claimed in claim 3 wherein said identifying step comprises the step of selecting a third subset of channels wherein each channel in said third subset of channels is included in said second subset of channels and said third subset of channels has fewer channels than said second subset of channels.

7. A method as claimed in claim 6 wherein:

said selecting step comprises the step of limiting said third subset to include a maximum number of channels, said maximum number of channels being less than 75% of the number of channels included in said second subset of channels; and said passing step passes said third subset of channels to said cordless base station.

8. A method as claimed in claim 1 wherein:

said location determining step determines when said handset is within said radio coverage area of said cordless base station; and said identifying step is performed when said handset is within said radio coverage area of said cordless base station.

9. A method as claimed in claim 1 wherein said identifying step comprises the steps of:

sequentially tuning a receiver to a predetermined plurality of radio communication channels;

for each of said plurality of channels, detecting signal strength of RF energy received over said channel; and for each of said plurality of channels, determining whether said signal strength for said channel is less than a predetermined threshold.

10. A method as claimed in claim 9 wherein:

additional cordless base stations may be located near said cordless base station; and said identifying step additionally comprises the step of defining, for any of said plurality of channels, a channel conveying a communication originating at any of said cordless base stations as being unused by said land station.

11. In a multi-mode communication network in which a common pool of channels is used for both cellular mode communications and cordless mode communications and in which radio coverage areas of a cellular land station and a cordless base station overlap, a method of operating a cordless radiotelephone communication system comprising the steps of:

identifying, in a portable radiotelephone handset configured to provide said cellular and said cordless modes of communications and to move within said radio coverage area of said cordless base station, a plurality of radio communication channels which are unused by said cellular land station;

passing identities of said plurality of channels from said handset to said cordless base station; and engaging in user communications between said handset and said cordless base station using one of said channels.

12. In a multi-mode communication network in which a common pool of channels is used for both cellular mode communications and cordless mode communications and in which radio coverage areas of a cellular land station and a cordless base station overlap, a method of operating a cordless radiotelephone communication system comprising the steps of:

identifying, in a handset configured to operate in said cordless mode, a plurality of radio communication channels which are unused by said cellular land station;

passing identities of said plurality of channels from said handset to said cordless base station;

composing, in said cordless base station after said passing step, a list of available channels, said list of available channels being responsive to said plurality of channels;

transmitting said list of available channels from said cordless base station to said handset; and engaging in user communications between said handset and said cordless base station using one of said channels by selecting a channel from said available channel list on which to conduct said user communications.

13. A method as claimed in claim 12 additionally comprising the step of monitoring, at said cordless base station, all channels included on said available channel list to detect an incoming message from said handset, said incoming message being transmitted on any of said channels included on said available channel list.

14. In a multi-mode communication network in which a common pool of channels is used for both cellular mode communications and cordless mode communications and in which radio coverage areas of a cellular land station and a cordless base station overlap, wherein said cellular land station communicates using a first subset of said pool of channels and said cordless base station communicates using channels selected from a second subset of said pool of channels, a method of operating a cordless radiotelephone communication system comprising the steps of:

identifying, in a handset configured to operate in said cordless mode, a plurality of radio communication channels which are unused by said cellular land station, said identifying step comprising the step of monitoring each channel included in said second subset to determine which of said second subset of channels also belongs to said first subset;

passing identities of said plurality of channels from said handset to said cordless base station; and engaging in user communications between said handset and said cordless base station using one of said channels.

15. A method as claimed in claim 14 wherein:

said handset is configured to engage in cellular mode communications with said cellular land station and to engage in cordless mode communications with said cordless base station;

said method additionally comprises the step of monitoring, at said handset, a pilot channel continuously transmitted by said cellular land station when said handset operates in said cellular mode; and said method additionally comprises the step of monitoring, at said handset, all channels included in said second subset of channels when said handset operates in said cordless mode.

16. A multi-mode portable radiotelephone which communicates in a cellular mode with a cellular land station having a first radio coverage area and in a cordless mode with a cordless base station having a second radio coverage area, said first and second areas overlapping each other, said portable radiotelephone comprising:

a controller;

an RF transmitter coupled to said controller; and an RF receiver coupled to said controller; wherein, said portable radiotelephone moves within said second radio coverage area; and said controller is configured to control said portable radiotelephone receiver to identify a plurality of radio communication channels which are unused by said cellular land station, to cause said portable radiotelephone transmitter to pass identities of said channels to said cordless base station, and to cause said portable radiotelephone transmitter and receiver to engage in user communications with said cordless base station using one of said channels.

17. A multi-mode portable radiotelephone configured to communicate in a cellular mode with a cellular land station having a first radio coverage area and in a cordless mode with a cordless base station having a second radio coverage area, said first and second areas overlapping each other, over any channel included in a pool of channels, wherein said cellular land station communicates using a first subset of said pool of channels, said cordless base station communicates using channels selected from a second subset of said pool of channels, said portable radiotelephone comprising:

a controller;

a transmitter coupled to said controller; and a receiver coupled to said controller; wherein, said controller is configured to control said receiver to monitor each channel included in said second subset to determine which of said second subset of channels also belongs to said first subset, to identify a plurality of radio communication channels which are unused by said cellular land station, to cause said transmitter to pass identities of said channels to said cordless base station, and to cause said transmitter and receiver to engage in user communications with said cordless base station using one of said channels.

18. A portable radiotelephone as claimed in claim 17 wherein said second subset of channels is configured as a contiguous block of channels.

19. A multi-mode portable radiotelephone which communicates in a cellular mode with a cellular land station having a first radio coverage area and in a cordless mode with a cordless base station having a second radio coverage area, said first and second areas overlapping each other, said portable radiotelephone comprising:

a controller;

a transmitter coupled to said controller; and a receiver coupled to said controller; wherein, said controller is configured to verify that said handset is located in said second radio coverage area prior to identifying a plurality of radio communication channels which are unused by said cellular land station, to cause said transmitter to pass identities of said channels to said cordless base station, and to cause said transmitter and receiver to engage in user communications with said cordless base station using one of said channels.

20. In a multi-mode communication network in which a common pool of channels is used for both cellular mode communications and cordless mode communications and in which a radio coverage area of a cellular land station overlies radio coverage areas for a plurality of cordless base stations, a method of operating a portable radiotelephone handset comprising the steps of:

- identifying a used channel at said handset from said common pool of channels;
- determining, in said handset, whether said used channel is conveying a cordless communication originating from one of said cordless base stations;
- defining said used channel as being an available channel if said user-channel is conveying said cordless communication; and
- passing an identity of said available channel from said handset to a home one of said cordless base stations to assign said available channel to said home cordless base station.

21. A method as claimed in claim 20 additionally comprising, after said passing step, the steps of:

- deciding whether said available channel is in use;
- refraining from using said available channel to communicate with said home cordless base station when said deciding step decides that said available channel is in use; and
- engaging in user communications with said home cordless base station using said available channel when said deciding step decides that said available channel is not in use.

22. A method as claimed in claim 20 wherein said identifying step comprises the steps of:

- sequentially tuning a receiver to a predetermined plurality of radio communication channels;
- for each of said plurality of channels, detecting signal strength of RF energy received over said channel; and
- for each of said plurality of channels, determining whether said signal strength for said channel is greater than a predetermined threshold.

23. A method as claimed in claim 20 wherein:

- said handset is configured to communicate with said land station and said home cordless base station over any channel included in said pool of channels;
- said cellular land station communicates using a first subset of said pool of channels;
- said cordless base stations communicate using channels selected from a second subset of said pool of channels; and
- said identifying step comprises the step of monitoring each channel included in said second subset of channels.

24. A method as claimed in claim 23 additionally comprising the steps of:

- monitoring a forward portion of a pilot channel continuously transmitted by said land station when operating in said cellular mode; and
- monitoring forward portions of all channels included in said second subset of channels when operating in said cordless mode.

25. A method as claimed in claim 20 additionally comprising the steps of:

- determining a location for said handset prior to said identifying step; and
- performing said identifying step when said location determining step indicates that said handset is located proximate said cellular base station.

26. A method as claimed in claim 25 wherein:

- said location determining step determines when said handset is within said radio coverage area of said home cordless base station; and
- said identifying step is performed when said handset is within said radio coverage area of said home cordless base station.

* * * * *